United States Patent
Hayashi et al.

[11] Patent Number: 6,112,521
[45] Date of Patent: Sep. 5, 2000

[54] BACKPRESSURE CONTROL CIRCUIT FOR HYDRAULIC DRIVE DEVICE

[75] Inventors: Seita Hayashi; Sadao Nunotani; Hideki Kado, all of Oyama, Japan

[73] Assignee: Komatsu Ltd., Tokyo, Japan

[21] Appl. No.: 09/194,334

[22] PCT Filed: May 23, 1997

[86] PCT No.: PCT/JP97/01734

§ 371 Date: Nov. 24, 1998

§ 102(e) Date: Nov. 24, 1998

[87] PCT Pub. No.: WO97/45659

PCT Pub. Date: Dec. 4, 1997

[30] Foreign Application Priority Data

May 27, 1996 [JP] Japan ................................ 8-155986

[51] Int. Cl.⁷ .................... F16D 31/02; F15B 11/08
[52] U.S. Cl. ................................ 60/460; 91/461
[58] Field of Search .................. 60/460, 459, 462, 60/463, 464, 466, 468; 91/461

[56] References Cited

U.S. PATENT DOCUMENTS

| | | | |
|---|---|---|---|
| 3,872,671 | 3/1975 | Verlinde | 60/460 |
| 3,913,453 | 10/1975 | Parquet | 91/420 |
| 5,063,742 | 11/1991 | Yoshimatsu | 60/466 |
| 5,081,839 | 1/1992 | McWilliams | 60/468 |
| 5,159,813 | 11/1992 | Yoshimatsu et al. | 60/459 |
| 5,222,870 | 6/1993 | Budzich | 60/468 X |
| 5,442,912 | 8/1995 | Hirata et al. | 60/468 X |
| 5,664,477 | 9/1997 | Koehler | 91/461 X |

FOREIGN PATENT DOCUMENTS

| | | |
|---|---|---|
| 60-29902 | 2/1985 | Japan . |
| 60-129402 | 7/1985 | Japan . |
| 61-165432 | 7/1986 | Japan . |
| 4-19406 | 1/1992 | Japan . |

*Primary Examiner*—John E. Ryznic
*Attorney, Agent, or Firm*—Sidley & Austin

[57] ABSTRACT

The present invention relates to a backpressure control circuit for a hydraulic drive device, which reduces the loss in drive power and which can suppress cavitation. Thus, the backpressure control circuit for hydraulic drive devices is a hydraulic drive circuit: for supplying to a hydraulic motor pressurized oil discharged from a hydraulic pump through a direction changeover valve, which is switched upon receipt of a pilot pressure; and for permitting at the time of braking by the hydraulic motor, a throttle valve to throttle return oil from the hydraulic motor and oil discharged from the hydraulic pump to generate a backpressure to supply pressurized oil to the hydraulic motor via a check valve for prevention of cavitation. The backpressure control circuit includes a pilot valve (60) for taking a pressure on a drive side of the hydraulic motor (24) as a pilot pressure upon receipt of a signal from an operating lever (39), and a variable throttle valve (80) for changing a backpressure to a low pressure or to a high pressure upon receipt of a pilot pressure from the pilot valve (60).

20 Claims, 10 Drawing Sheets

BACKPRESSURE CONTROL CIRCUIT FOR HYDRAULIC DRIVE DEVICE

TECHNICAL FIELD

The present invention relates to a backpressure control circuit for a hydraulic drive device and, more particularly, to a backpressure control circuit which can change a backpressure of a hydraulic drive device for supplying a pressurized oil, discharged from a hydraulic pump, to a hydraulic traveling motor in a hydraulic drive-type travel vehicle, such as a construction machine or the like, and for driving the motor.

BACKGROUND ART

In order to drive a hydraulic traveling motor in a hydraulic drive-type travel vehicle, oil, discharged from a hydraulic pump, is switched by a direction changeover valve and is subsequently supplied to one of the two ports of the hydraulic motor. Return oil flows from the other port of the hydraulic motor to a tank via the direction changeover valve, and rotationally drives the hydraulic motor in one direction, for example the forward direction or the backward direction, or in the other direction to drive a traveling body.

In the meantime, when the hydraulic drive type travel vehicle goes downhill, the drive wheels are rotated by gravity acting on the vehicle, and the hydraulic motor is inversely driven by the drive wheels, so that the hydraulic drive type travel vehicle descends rapidly. In such a case, the hydraulic motor needs to be braked and stopped.

Accordingly, two of the present inventors and another proposed a drive device for a hydraulic motor in an unpublished Japanese Patent Application No. 7-065718. The unpublished proposal will be described with reference to FIGS. 8 and 9. Specifically, a directional control valve (a direction changeover valve) is a pilot pressure changeover type, and a pilot pressure supply valve is provided for supplying a pressure of a main circuit as a pilot pressure to a pressure receiving element of the directional control valve. When the hydraulic motor is inversely driven by an external force, such as a traveling body and the like, the pressure of the main circuit is lowered, whereby the pilot pressure is lowered so that the directional control valve is switched to its neutral position to give a braking force to the hydraulic motor. When the directional control valve is in its neutral position, a predetermined pressure is supplied to the main circuit, thus securing the pilot pressure and preventing cavitation at the time of braking and stopping.

In other words, as shown in FIG. 8, a pilot pressure supply valve 37, which is switched to its first position G or its second position H in accordance with a command from a final control element 38, is provided. A directional control valve 30 is switched to its first position B or its second position C upon receipt of the pressure of the first main circuit 21 or the pressure of the second main circuit 22 of a hydraulic motor 24, either of which passed through the pilot pressure supply valve 37. When the directional control valve 30 is switched to its first position B, pressurized oil discharged from the hydraulic pump 20, flows into the first port 25 of the hydraulic motor 24 via the first main circuit 21, and return oil flows from the second port 26 into the tank 27 via the second main circuit 22, the directional control valve 30, and the backpressure valve 35, so that the hydraulic motor 24 is rotationally driven in one direction (indicated by the arrow D). Also when the directional control valve 30 is switched to its second position C, the hydraulic motor 24 is rotationally driven in the other direction (indicated by the arrow E) in the same way as above.

As described above, when the hydraulic motor 24 is inversely driven by an external force, such as a traveling body and the like, while being rotationally driven, the pressure of the first main circuit 21 or the second circuit 22 is reduced so that the directional control valve 30 is switched to its neutral position A, where the first check valve 31 and the second check valve 32 prevent pressurized oil from the first port 25 and the second port 26 of the hydraulic motor 24 from flowing into the tank 27, so that the hydraulic motor 24 is braked and stopped.

Meanwhile, when the directional control valve 30 is in its neutral position A, the pressurized oil, discharged from the hydraulic pump 20, flows into the tank 27 via the backpressure valve 35 and thus the discharge pressure is equal to the set pressure of the backpressure valve 35. The pressurized oil is supplied from the first check valve 31 and the second check valve 32 to the first main circuit 21 and the second main circuit 22 so that the pressures of the first and second main circuits 21 and 22 do not change over to negative pressures at the time of braking and stopping, whereby cavitation never occurs.

However, in the aforesaid unpublished proposal, the return oil from the hydraulic motor 24 always flows into the tank 27 via the backpressure valve 35. Hence, the set pressure of the backpressure valve 35 is applied to the return oil even at the time of drive by the hydraulic motor 24, thereby raising the pressure of the pressurized oil, discharged from the hydraulic pump 20, by the same pressure as the set pressure. Accordingly, horsepower to drive the hydraulic pump 20 in a manner corresponding to the above raised pressure is needed, which leads to a lowering of the drive efficiency. When the hydraulic motor 24 is used at a low speed rotation, there is little loss in horsepower since cavitation never occurs even when the set pressure of the backpressure valve 35 is low. However, when the hydraulic motor 24 is used at a high speed rotation, there is the following disadvantage. When a set pressure is low even if the backpressure valve 35 is used, as shown in FIG. 9, the backpressure is in short supply at the time of braking and stopping, thus causing cavitation. Therefore, the set pressure of the backpressure valve 35 should be increased. With the increase of the set pressure, more drive horsepower is needed, thereby increasing the loss in horsepower and lowering the drive efficiency. Accordingly, the usage of rotating the hydraulic motor 24 at high speed, thereby gaining power, is difficult.

SUMMARY OF THE INVENTION

The present invention is made in view of the above disadvantage and its object is to provide a backpressure control circuit for a hydraulic drive device, in which a changeover valve, having a function of a counterbalance valve, is used, and a variable backpressure valve, for switching the changeover valve by means of a drive pressure and for changing over a backpressure of return oil to a high pressure or a low pressure according to the driving conditions of the hydraulic motor, is provided to reduce the loss in drive power and to suppress cavitation which occurs at the time of stopping and reverse rotation during high speed rotation.

The first configuration of a backpressure control circuit for a hydraulic drive device according to the present invention is characterized in that the backpressure control circuit for a hydraulic drive device, which is a hydraulic drive circuit for supplying to a hydraulic motor pressurized oil discharged from a hydraulic pump through a direction changeover valve which is switched upon receipt of a pilot pressure and for permitting a throttle valve at the time of braking by the hydraulic motor to throttle return oil from the hydraulic motor and oil discharged from the hydraulic pump to generate a backpressure to supply the pressurized oil to the hydraulic motor via a check valve for the prevention of cavitation, includes:

a pilot valve for taking a pressure on a drive side of the hydraulic motor as a pilot pressure upon receipt of a signal from an operating lever, and wherein the throttle valve is a variable throttle valve for changing a backpressure to a low pressure or to a high pressure upon receipt of the taken-out pilot pressure from the pilot valve, wherein return oil from the hydraulic motor flows into a tank via the variable throttle valve when the backpressure of the variable throttle valve is a low pressure and return oil from the hydraulic motor is supplied to the drive side of the hydraulic motor when the backpressure is a high pressure, and wherein a means for prolonging and maintaining the taken-out pilot pressure for a predetermined time period and for allowing the taken-out pilot pressure to operate on the variable throttle valve, when the direction changeover valve is switched, is provided.

According to the aforesaid configuration, the return oil from the hydraulic motor flows into a tank via the variable throttle valve. In driving conditions wherein the hydraulic motor outputs torque, the set pressure of the variable throttle valve is low, thus reducing the pressure loss of the return oil and the loss in drive power. Meanwhile, when the hydraulic motor is inversely driven by an external force, or the motor is braked or stopped, the set pressure of the variable throttle valve is high so that a large quantity of return oil is supplied to the drive side of the hydraulic motor. Thus, cavitation never occurs in the hydraulic motor circuit. Even if an open hydraulic circuit is used specifically in hydraulic drive, cavitation no longer occurs in the hydraulic motor circuit of the aforesaid configuration. Moreover, as compared with a conventional closed hydraulic circuit in which a charge pressure oil is supplied, the supply power of a charge pressure oil is unnecessary, thus saving energy. Furthermore, a pressure on the drive side of the hydraulic motor is taken as a signal to switch the direction changeover valve and the variable throttle valve, so that a high pressure and a low pressure of the variable throttle valve are precisely controlled according to the pressure on the drive side. In addition, when the hydraulic motor is inversely driven from a forward movement to a backward movement or from a backward movement to a forward movement, the variable throttle valve maintains a high pressure for the predetermined time period, so that cavitation no longer occurs in the hydraulic motor circuit even at the time of switching.

The second configuration of a backpressure control circuit for a hydraulic drive device according to the present invention is characterized in that in the backpressure control circuit for a hydraulic drive device, which is a hydraulic drive circuit for supplying to hydraulic actuators such as a hydraulic motor, a hydraulic cylinder, and the like, pressurized oil discharged from a hydraulic pump through a direction changeover valve, which is switched upon receipt of a pressure from a pressure proportional control valve to which an operating lever is attached, and for permitting a throttle valve to throttle return oil from the hydraulic actuators and oil discharged from the hydraulic pump to generate a backpressure to supply the pressurized oil to the hydraulic actuators via a check valve for prevention of cavitation, the throttle valve is a variable throttle valve for taking the pressurized oil discharged from the hydraulic pump as a pilot pressure via the direction changeover valve when the direction changeover valve is switched, and for changing over a backpressure to a low pressure or to a high pressure by the taken-out pilot pressure, return oil from a hydraulic actuator flows into a tank through the variable throttle valve when a backpressure of the variable throttle valve is a low pressure and return oil from the hydraulic actuator is supplied to the drive side of the hydraulic actuator when the backpressure is a high pressure, and a means for prolonging and maintaining the taken-out pilot pressure for a predetermined time and allowing the taken-out pilot pressure to operate on the variable throttle valve when the direction changeover valve is switched, is provided.

According to the aforesaid configuration, the same operation effect, that the first configuration has, is obtained. In addition, a pilot pressure operating on the variable throttle valve is guided from the drive side of the hydraulic motor only by the direction changeover valve in the second configuration, whereby its structure is simplified. Besides, a closed center-type direction changeover valve is used, which makes it possible to let the flow rate pass according to a manipulated variable (movement of a spool), thus facilitating control. Moreover, even if the closed center-type direction changeover valve is used, a backpressure is applied on a return oil and the backpressure is supplied to the hydraulic actuators via the check valve, thereby preventing cavitation. In addition, when the hydraulic motor is inversely driven from a forward movement to a backward movement or from a backward movement to a forward movement, the variable throttle valve maintains a high pressure for the predetermined time, so that cavitation no longer occurs in the hydraulic motor circuit even at the time of switching.

It is also possible that the variable throttle valve makes the return oil passing to the tank have a low pressure when the pilot pressure is high and makes the return oil from the hydraulic motor and the oil discharged from the hydraulic pump have high pressures when the pilot pressure is low.

According to the aforesaid configuration, in the driving conditions wherein the hydraulic motor outputs torque, the set pressure of the variable throttle valve is low, thus reducing the pressure loss of the return oil and the loss in drive power. As a result, energy can be saved. Since the occurrence of cavitation is prevented by raising the set pressure when necessary, the set pressure of the throttle valve can be usually set low. Therefore, even if the rotational speed of the hydraulic motor is increased, the backpressure does not rise. Thus, the usage of rotating the hydraulic motor at high speed, thereby gaining power, is possible.

A plurality of direction changeover valves including changeover valves for taking a pilot pressure can be provided, and the pilot pressures taken from a plurality of the changeover valves can be unified through a shuttle valve to operate on the variable throttle valve.

According to the aforesaid configuration, oil discharged from the hydraulic pump is guided as a pilot pressure operating on the variable throttle valve from the direction changeover valve, whereby the structure is simplified. When a plurality of hydraulic actuators are controlled by respective direction changeover valves, the pilot pressures are taken from hydraulic actuators which are prone to cause cavitation, and the pilot pressures can be unified to operate on the variable throttle valve. Accordingly, a return oil is not throttled for hydraulic actuators which do not tend to cause cavitation, thus reducing the pressure loss of the return oil and the loss in drive power, hence saving energy.

A timer valve for prolonging and maintaining a pilot pressure, which is taken when the direction changeover valve is switched, for a predetermined time period can be also disposed between the pilot valve and the variable throttle valve. According to the above configuration, when the hydraulic motor is inversely driven from a forward movement to a backward movement or from a backward movement to a forward movement, the variable throttle valve maintains a high pressure for the predetermined time period, so that cavitation no longer occurs in the hydraulic motor circuit even at the time of switching.

BEST MODE FOR CARRYING OUT THE INVENTION

Preferable embodiments of the present invention will be described in detail below with reference to the attached drawings.

FIGS. 1 through 5 show the first embodiment of a backpressure control circuit for a hydraulic drive device which is applied to a circuit in which a changeover valve and a valve for a brake pressure are integrated. Incidentally, parts in common with FIG. 7 will be described with the same numerals and symbols.

Figure 1:
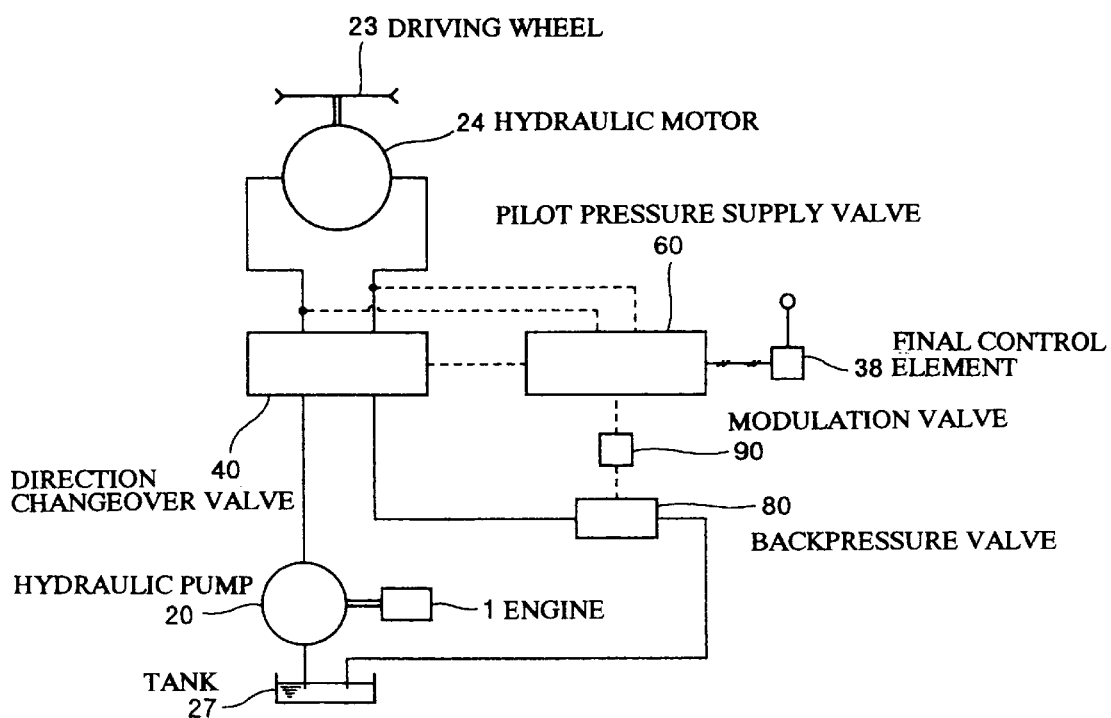
FIG. 1 is a schematic view of a backpressure control circuit for a hydraulic drive device according to the first embodiment of the present invention.

In FIG. 1, a hydraulic pump 20 is driven by an engine 1 and sucks in oil from a tank 27. A discharged flow of pressurized oil is switched by a direction changeover valve 40 and is supplied to a hydraulic motor 24 to drive the hydraulic motor 24. The hydraulic motor 24 drives the driving wheels 23 of the vehicle to move the vehicle forwardly or backwardly. At this time, return oil from the hydraulic motor 24 forms a circulating circuit where the return oil returns to the tank 27 via the direction changeover valve 40 through a backpressure valve (a variable throttle valve) 80. A pilot pressure supply valve (a pilot valve) 60 is switched by a command from a final control element 38 to take a drive pressure of the hydraulic motor 24 as a signal. While sending the signal as a changeover command to the direction changeover valve 40, the pilot pressure supply valve 60 also sends a change command of a set pressure to the backpressure valve 80 via a modulation valve 90.

The direction changeover valve 40 will be described with reference to FIG. 2. The direction changeover valve 40 includes a pump port 41, a tank port 42, a first actuator port 43, and a second actuator port 44. A discharge passage 20a of the hydraulic pump 20 is connected to the pump port 41, the backpressure valve 80 is connected to the tank port 42 via a return passage 28, a first main circuit 21 is connected to the first actuator port 43, and a second main circuit 22 is connected to the second actuator port 44. In addition, a backpressure passage 29, diverging from the return passage 28, is connected to the first main circuit 21 and the second main circuit 22 through check valves 34a and 34b, respectively.

The direction changeover valve 40 is a type, e.g., a pilot pressure changeover type, in which the direction changeover valve 40 is held at its neutral position A by a first spring 51 and a second spring 52, is switched to its first position B by the pressure of a first pressure receiving element 53, and is switched to a second position C by the pressure of a second pressure receiving element 54. The pressures (hydraulic motor driving pressures) of the first main circuit 21 and the second main circuit 22 are supplied to the first pressure receiving element 53 and the second pressure receiving element 54, respectively, via the pilot pressure supply valve 60, which will be described later.

When the direction changeover valve 40 is in its neutral position A, the pump port 41 communicates with the first actuator port 43 and the second actuator port 44 through a first check valve 55 and a second check valve 56 respectively, and the pump port 41 also communicates with the tank port 42. Thus, pressurized oil discharged, from the hydraulic pump 20, flows into the tank 27 via the discharge passage 20a, the return passage 28, and the backpressure valve 80, whereby the discharge pressure thereof is determined by the backpressure valve 80. The pressurized oil is supplied to the first main circuit 21 and the second main circuit 22 from the first and second check valves 55 and 56, but pressurized oil does not flow from the first and second main circuits 21 and 22 into the pump port 41 or the tank port 22. Consequently, the hydraulic motor 24 does not rotate even if an external force operates on it.

When the direction changeover valve 40 is in its first position B, the pump port 41 communicates with the first actuator port 43, and the tank port 42 communicates with the second actuator port 44. Thus, the pressurized discharged oil from the hydraulic pump 20 flows into the first port 25 of the hydraulic motor 24 through the first main circuit 21; pressurized oil (return oil) flows from the second port 26 into the tank 27 through the second main circuit 22, the direction changeover valve 40, and the backpressure valve 80; and the hydraulic motor 24 is rotationally driven in one direction (indicated by the arrow S).

When the direction changeover valve 40 is in its second position C, the pump port 41 communicates with the second actuator port 44, and the tank port 42 communicates with the first actuator port 43. Thus, the pressurized discharged oil from the hydraulic pump 20 flows into the second port 26 of the hydraulic motor 24 through the second main circuit 22; pressurized oil (return oil) flows from the first port 25 into the tank 27 through the first main circuit 21, the direction changeover valve 40, and the backpressure valve 80; and the hydraulic motor 24 is rotationally driven in the other direction (indicated by the arrow R).

The direction changeover valve 40 goes through its third position D when moving from its first position B to its neutral position A. While communicating with the first actuator port 43 in the third position D, the pump port 41 also communicates with the second actuator port 44 through a throttle 57, and the second actuator port 44 communicates with the tank port 42 through a throttle 58. Thus, a portion of the oil discharged from the hydraulic pump 20 flows into the first port 25 of the hydraulic motor 24 through the first main circuit 21, and the remaining oil flows into the second actuator port 44 through a throttle 57. The pressurized oil (the return oil) from the second port 26 flows into the tank 27 through the second main circuit 22, the second actuator port 44, the throttle 58, and the backpressure valve 80, but the flow is suppressed by the throttle 58 so that the hydraulic motor 24 is braked.

When the direction changeover valve 40 is in its fourth position E, the pump port 41 communicates with the first actuator port 43 via a throttle 57, while also communicating with the second actuator port 44. At the same time, the first actuator port 43 communicates with the tank port 42 via a throttle 58. Thus, a portion of the oil discharged from the hydraulic pump 20 flows into the second port 26 of the hydraulic motor 24 through the second main circuit 22, and the remaining oil flows into the first actuator port 43 via the throttle 57. The pressurized oil (the return oil) from the first port 25 flows into the tank 27 through the first main circuit 21, the first actuator port 43, the throttle 58, and the backpressure valve 80, but the flow is suppressed by the throttle 58 so that the hydraulic motor 24 is braked.

The pilot pressure supply valve 60 will be described with reference to FIG. 2. The pilot pressure supply valve 60 includes a first port 61, a second port 62, a third port 63, a fourth port 64, a fifth port 65, and a tank port 66. The first port 61 is connected to the first main circuit 21 via a first pilot circuit 45, the second port 62 is connected to the second main circuit 22 via a second pilot circuit 46, the third port 63 is connected to the first pressure receiving element 53 via a third pilot circuit 47, the fourth port 64 is connected to the second pressure receiving element 54 via a fourth pilot circuit 48, the fifth port 65 is connected to a pressure receiving element 83 of the backpressure valve 80 via a fifth pilot circuit 49 and a modulation valve 90, which will be described later, and the tank port 66 is connected to the tank 27.

The pilot pressure supply valve 60 is a type, e.g., a solenoid changeover type, in which the pilot pressure supply valve 60 is held at its neutral position F by a first spring 71 and a second spring 72, is switched to its first position G by a first solenoid 73, and is switched to its second position H by a second solenoid 74. An electric current is selectively supplied to the first and second solenoids 73 and 74 by operating the final control element 38. Incidentally, the pilot pressure supply valve 60 can be a manual changeover type in which the pilot pressure supply valve 60 is manually switched to the first and second positions G and H, or can be a pilot pressure changeover type for changing over responsive to a pilot pressure.

When the pilot pressure supply valve 60 is in its neutral position F, the first port 61 and the second port 62 are closed and the third port 63, the fourth port 64, and the fifth port 65 communicate with the tank port 66. Hence, the pressurized oil at the first and second pressure receiving elements 53 and 55 of the direction changeover valve 40 and the pressurized oil at the pressure receiving element 83 of the backpressure valve 80 flow into the tank 27, and the direction changeover valve 40 is switched to its neutral position A, whereby the set pressure of the backpressure valve 80 becomes low.

When the pilot pressure supply valve 60 is in its first position G, the first port 61, the third port 63, and the fifth port 65 communicate with one another; the fourth port 64 communicates with the tank port 66; and the second port 62 is closed. Consequently, the direction changeover valve 40 is switched to its first position B when pressurized oil from the first main circuit 21 is supplied to the first pressure receiving element 53 of the direction changeover valve 40 and to the pressure receiving element 83 of the backpressure valve 80. Specifically, synchronizing with a pilot pressure supplied to the direction changeover valve 40, pressurized oil from the first main circuit 21 is supplied as a pilot pressure to the backpressure valve 80 via the pilot pressure supply valve 60.

When the pilot pressure supply valve 60 is in its second position H, the direction changeover valve 40 is switched to its second position C in the same way as the case of the aforementioned first position G. Synchronizing with the pilot pressure supplied to the direction changeover valve 40, pressurized oil from the second main circuit 22 is supplied as a pilot pressure to the backpressure valve 80 via the pilot pressure supply valve 60.

The backpressure valve 80 and the modulation valve 90 will be described with reference to FIGS. 2 and 3. As shown in FIG. 2, the backpressure valve 80 includes a first port 81, a second port 82, and the pressure receiving element 83. The first port 81 is connected to the tank port 42 of the direction changeover valve 40 via the return passage 28; the second port 82 is connected to the tank 27; and the pressure receiving element 83 is connected to the fifth port 65 of the pilot pressure supply valve 60 via the fifth pilot circuit 49 and the modulation valve 90.

Figure 3:
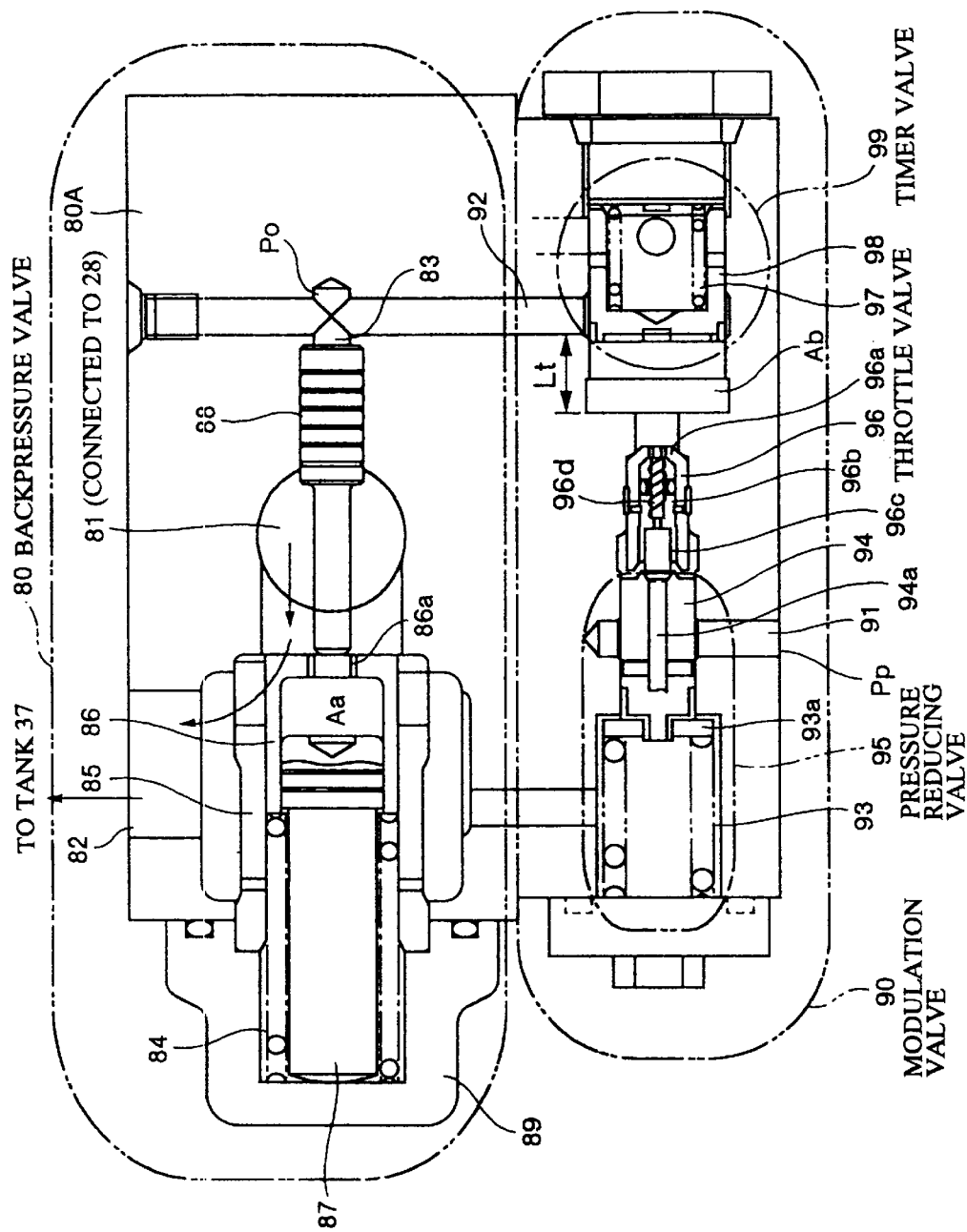
FIG. 3 is a structural drawing of the backpressure valve and the modulation valve in FIG. 2.

As shown in FIG. 3, the backpressure valve 80 is composed of a body 80A, a spring 84, a sleeve 85, a first piston 86, a second piston 87, a third piston 88, and a cover 89. The first port 81, the second port 82, and the port for the pressure receiving element 83 are bored in the body 80A. The sleeve 85 is fixedly inserted into the body 80A, and the first piston 86 is closely and slidably inserted into the inside of the sleeve 85. The first piston 86 blocks or connects the first port 81 and the second port 82. A hole 86a is bored in one end of the first piston 86 to connect the first port 81 and a pressure receiving chamber Aa, which will be described later, thereby reducing an attaching load of the spring 84 and preventing the shape of the spring 84 from increasing in size. The spring 84 is accommodated within the sleeve 85 and the cover 89, with one end thereof abutting on the cover 89 and the other end thereof abutting on the first piston 86. The spring 84 operates so as to block the first port 81 and the second port 82. The second piston 87 is accommodated within the first piston 86, with one end of piston 87 abutting on the cover 89; and the pressure receiving chamber Aa, for receiving a pressure from the first port 81, is formed at the other end of the piston 87. The third piston 88 is slidably and closely inserted into the body 80A, with one end thereof abutting on the second piston 87, and the other end thereof being formed so as to receive a pressure which operates on the pressure receiving element 83.

In the above description, the first piston 86 is pushed by the spring 84 to let the first port 81 communicate with the second port 82 while a predetermined set pressure in the return passage 28 is held, and pressurized oil of the return passage 28 flows into the tank 27. However, the operation of a pilot pressure on the pressure receiving element 83 pushes the first piston 86 via the third piston 88 while moving the spring 84 in a direction in which an opening is widened, whereby the set pressure is lowered. Therefore, the pressure of the return passage 28 is lowered.

Figure 2:
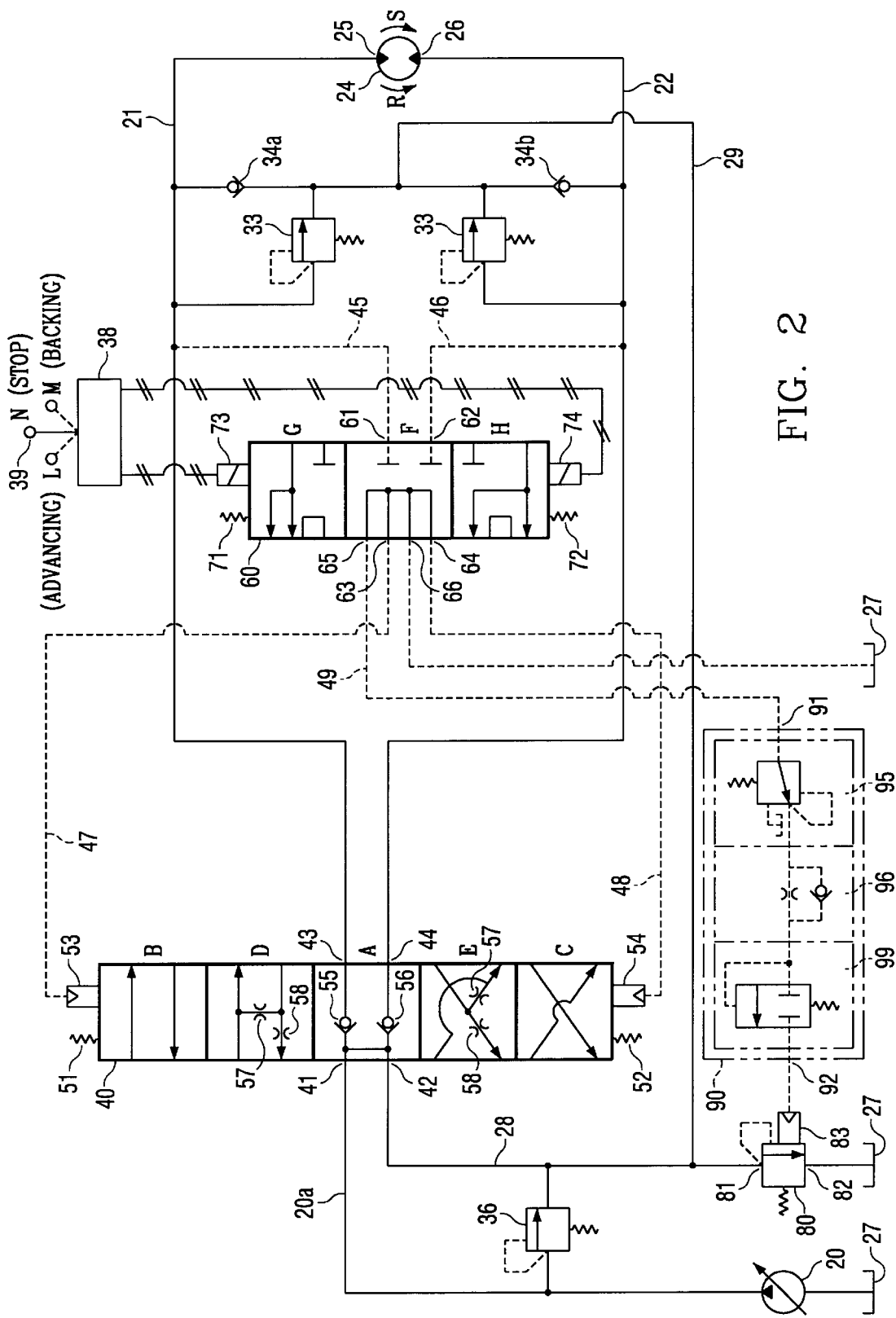
FIG. 2 is a schematic circuit diagram according to the first embodiment of the present invention.

As shown in FIG. 2, the modulation valve 90 comprises a pressure reducing valve 95, a throttle valve 96, and a timer valve 99. Moreover, the modulation valve 90 includes a first port 91 and a second port 92. The first port 91 is connected to the fifth port 65 of the pilot pressure supply valve 60 via the fifth pilot circuit 49, and the second port 92 is connected to the pressure receiving element 83 of the backpressure valve 80.

As shown in FIG. 3, the modulation valve 90 is attached to the body 80A in common with the backpressure valve 80. The first port 91 and the second port 92 are bored in the body 80A.

The pressure reducing valve 95 is composed of a piston 94, a washer 93a, and a spring 93. The piston 94 is slidably and closely inserted into a through hole bored in the body 80A. A hole 94a is bored in the center portion of the piston 94. One end of the hole 94a faces an outside diameter perpendicularly to an intermediate portion in a longitudinal direction and the other end thereof (the right end shown in the drawing) is connected to the pressure receiving element 83 via the throttle valve 96 and the second port 92. A hole for the first port 91 is made in a right-angled direction near one end of the hole 94a, and the first port 91 and the hole 94a on one end of the piston 94 are connected at an ordinary position (below a predetermined pressure). The washer 93a abuts on the left end portion of the piston 94, as shown in the drawing, and the spring 93 abuts on the washer 93a. When moving to the left, the piston 94 is pushed by the spring 93 to reduce the pressure at the first port 91 so that the pressure on the downstream throttle valve 96 side will be below a predetermined pressure.

The throttle valve 96 comprises a check valve piston 96a, a throttle piston 96b, and a spring 96c. The check valve piston 96a is slidably and closely inserted into a through hole bored in the body 80A to inhibit a large quantity of flow from the pressure reducing valve 95 to the pressure receiving element 83, and to allow a large quantity of flow from the pressure reducing element 83 to the pressure reducing valve 95. A hole is made in a center portion of the check valve piston 96a, and the throttle piston 96b is inserted into the hole to throttle a pressure from the pressure reducing valve 95 to the pressure receiving element 83. As a throttle, a hole is bored in a center portion of the throttle piston 96b and a plurality of balls 96d is inserted into the hole to compose the throttle. Thus, throttling by inserting a plurality of balls instead of throttling by a small hole prevents clogging by dust.

One end of the spring 96c abuts the throttle piston 96b and the other end thereof abuts the piston 94. The spring 96c pushes the check valve piston 96a via the throttle piston 96b on one side thereof and contracts so as to move the check valve piston 96a to the left, as shown in the drawing, at the time of the flow from the pressure receiving element 83 to the pressure reducing valve 95. The spring 96c pushes so as to close the piston 94 on the other end.

The timer valve 99 is composed of a spring 97 and a timer check valve 98. The timer check valve 98 is slidably and closely inserted into a through hole bored in the body 80A. One end portion thereof connects with the throttle valve 96 and the spring 97 is disposed on the other end so as to push to close the timer check valve 98. At this time, the second port 92 and the pressure receiving element 83 communicate with the tank 27 via the timer check valve 98. The second port 92 is bored in the outside diameter of the timer check valve 98 at a position which is a predetermined distance Lt away from one end. If the timer check valve 98 moves a predetermined distance to the right, as shown, it provides communication with the second port 92 for a flow of pressurized oil from the throttle valve 96 to the second port 92. A predetermined space portion Ab is formed during this movement to delay the flow from the pressure reducing valve 95 to the pressure receiving element 83.

In the above configuration, if a pilot pressure Pp, outputted from the fifth port 65 of the pilot pressure supply valve 60, operates on the first port 91, the pressure is reduced by the pressure reducing valve 95 and the flow is reduced by the throttle valve 96; subsequently a pressure Po is transmitted to the second port 92 after the timer valve 99 is moved sufficiently. Consequently, a time lag is produced between the pilot pressure Pp and the pressure Po which operates on the pressure receiving element 83 of the backpressure valve 80. Incidentally, the modulation valve 90 can be a solenoid changeover type, for example, for opening or closing the fifth pilot circuit 49 responsive to an electrical signal. In this case, an electrical signal for producing the time lag can be provided by a fixed timer in which a fixed value is previously set, or a vehicle speed response-type timer which can detect the vehicle speed and change the time period of the timer.

In the aforesaid embodiment, a main relief valve 36 conducts a relieving operation when the pressure exceeds the highest drive pressure set for driving the hydraulic motor 24. Therefore, when the direction changeover valve 40 is in its first position B or in its second position C, the drive pressure of the hydraulic motor 24 can rise to the highest pressure set by the main relief valve 36.

When the hydraulic motor 24 is inversely driven by an external force and the direction changeover valve 40 returns its neutral position A, or when the direction changeover valve 40 is abruptly operated from its first portion B to its second position C, or from its second position C to its first position B, there is a possibility that the pressure of the first main circuit 21 or the pressure of the second main circuit 22 rises excessively, thereby causing damage to the device. In consideration of that possibility, safety valves 33 are provided in the first and second main circuits 21 and 22. The set pressure of the relief valves 33 is set higher than the set pressure of the main relief valve 36.

The operation in FIG. 2 will be described. When an operating lever 39 of the final control element 38 is in a stop position N, the pilot pressure supply valve 60 is in its neutral position F due to the first and second springs 71 and 72. At this time, the direction changeover valve 40 is also in its neutral position A, and pressurized oil discharged from the hydraulic pump 20 flows into the tank 27 via the backpressure valve 80. The discharge pressure is equal to the set pressure of the backpressure valve 80, and the pressurized oil is supplied from the first and second check valves 55 and 56 to the first and second main circuits 21 and 22. However, the pressurized oil of the first and second main circuits 21 and 22 does not flow into the pump port 41 and the tank port 42, so that the hydraulic motor 24 does not rotate. At this time, the pressure receiving portion 83 of the backpressure valve 80 opens to the tank 27, so that the set pressure of the backpressure valve 80 is raised. If the operating lever 39 is in the stop position N at this time, the position is detected and the amount of the pressurized oil discharged from the hydraulic pump 20 is decreased by a configuration which is not shown.

When an operator manipulates the operating lever 39 from the stop position N to the advancing position L, the first solenoid 73 is electrified and the pilot pressure supply valve 60 is switched from its neutral position F to its first position G. At this time, the pressure of the first main circuit 21 is supplied as a pilot pressure to the first pressure receiving element 53 of the direction changeover valve 40 from the first position G of the pilot pressure supply valve 60 via the third pilot circuit 47. Thus, the direction changeover valve 40 is switched from its neutral position A to its first position B and oil discharged from the hydraulic pump 20 is supplied to the first main circuit 21. Meanwhile, pressurized oil from the second main circuit 22 flows into the tank 27 through the backpressure valve 80, and the hydraulic motor 24 is rotationally driven in a forward direction (indicated by the arrow S).

Simultaneously with the aforesaid rotational drive, a pressure of the first main circuit 21 is supplied as the pilot pressure Pp from the first position G of the pilot pressure supply valve 60 to the pressure receiving element 83 of the backpressure valve 80 via the fifth pilot circuit 49 and the first port 91 of the modulation valve 90. Thus, the pilot pressure Pp operates on the pressure receiving element 83 of the backpressure valve 80 so that the set pressure of the back pressure valve 80 is lowered, whereby there is little loss in drive power. The pressure of the first main circuit 21 operates on the direction changeover valve 40 and the pressure receiving element of the backpressure valve 80, so that the direction changeover valve 40 is switched when the pressure exceeds a predetermined pressure valve and the pressure of the backpressure valve 80 is also reduced, thus preventing the occurrence of cavitation. In addition, since the timer valve 99 is provided, the pressure of the backpressure valve 80 is not lowered unless the pressure of the first main circuit 21 is above the predetermined pressure and a predetermined period of time passes. Hence, even if there is a change in pressure at the time of starting or the like, the occurrence of cavitation can be certainly prevented.

When the operating lever 39 is manipulated from the stop position N to the backing position M, the second solenoid valve 74 is electrified and the pilot pressure supply valve 60 is switched from its neutral position F to its second position H. In the same way as the case of the first position G, the hydraulic motor 24 is rotationally driven in a backward direction (indicated by the arrow R). Also at this time, the direction changeover valve 40 and the backpressure valve 80 are operated by the second main circuit 22, whereby similarly to an advancing movement there is little loss in drive power and the occurrence of cavitation can be prevented.

Figure 4:
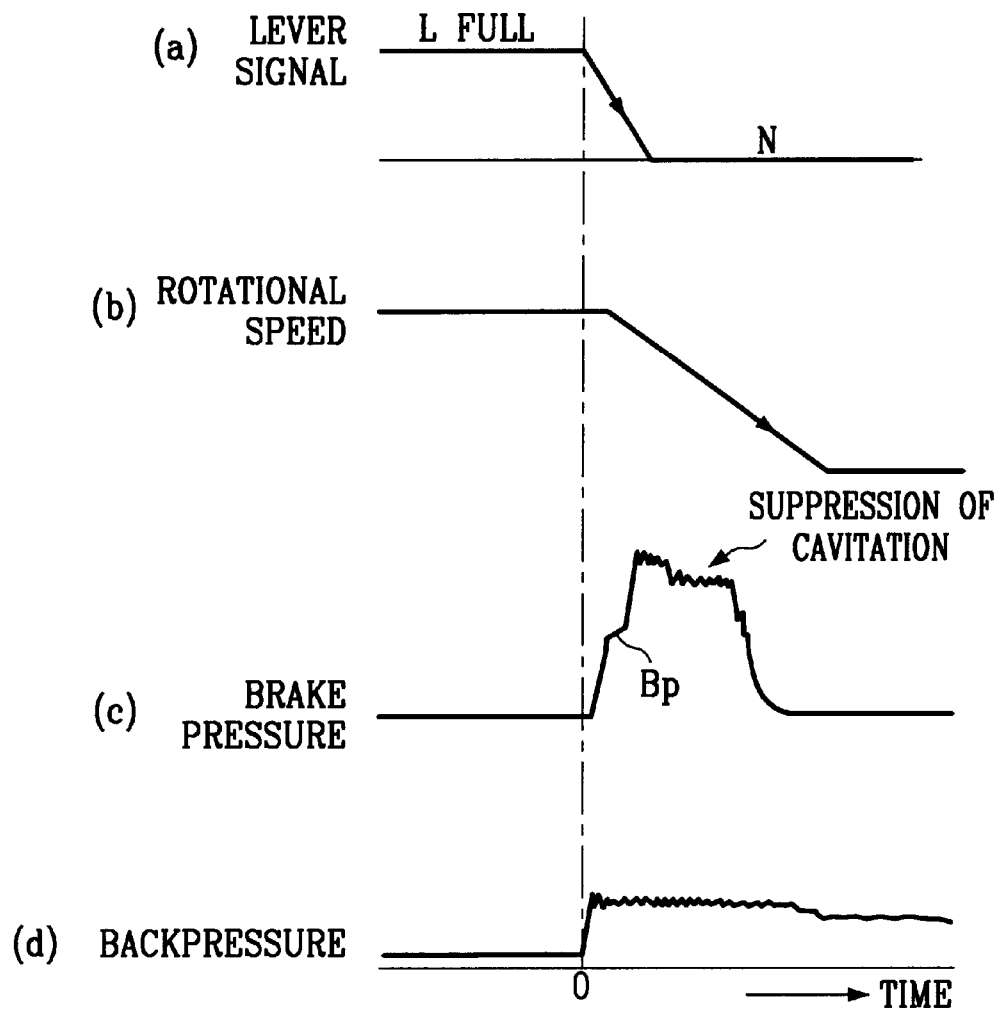
FIG. 4 is a time chart illustrating the situation of suppressed cavitation when the operating lever in FIG. 3 is operated from an advancing full position to a neutral position.

The case of manipulating the operating lever 39 from the advancing position L to the neutral position N will be described. In FIG. 4, the horizontal axis shows time. In the vertical axis, (a) shows a lever signal from the operating lever 39, (b) shows the rotational speed of the hydraulic motor 24, (c) shows the pressure on the return side from the hydraulic motor 24 (between the hydraulic motor 24 and the direction changeover valve 40), that is, a brake pressure, and (d) shows the return pressure on the upstream side of the backpressure valve 80 (between the direction changeover valve 40 and the tank 27), that is, the backpressure.

When the operator manipulates the operating lever 39 from the advancing full position L to the neutral position N, the pilot pressure supply valve 60 is switched from its first position G to its neutral position F, and the direction changeover valve 40 passes its third position D when moving from its first position B to its neutral position A. During this movement, the flow of pressurized oil (return oil) from the second port 26 or the first port 25 is suppressed by the throttle 58, and the hydraulic motor 24 is braked. This braking corresponds to a portion, designated with the symbol Bp, of a brake pressure shown in FIG. 4(c). Thus, a shock at the time of braking can be alleviated.

After moving further, the pilot pressure supply valve 60 comes to its neutral position F and the direction changeover valve 40 comes to its neutral position A. Return oil from the hydraulic motor 24, that is, return oil from the second main circuit 22, is prevented from flowing out to the return passage 28 by the second check valve 56 of the direction changeover valve 40. The hydraulic motor 24, however, rotates by inertia force as shown in FIG. 4(b), whereby a hydraulic pressure of the second main circuit 22 rises as shown in FIG. 4(c). The raised hydraulic pressure operates on the hydraulic motor 24 as a brake pressure so that the hydraulic motor 24 is braked and stopped. At this time, the first main circuit 21 tends to be at a negative pressure due to a reduced pressure oil being supplied thereto with a reduction in the discharge from the hydraulic pump 20 while the hydraulic motor 24 is rotating by inertia force. In addition, the pressure supplied as the pilot pressure Pp, from the first position G of the pilot pressure supply valve 60 to the pressure receiving element 83 of the backpressure valve 80 via the fifth pilot circuit 49 and the first port 91 of the modulation valve 90, decreases to nothing. At the same time, the pilot pressure Pp of the pressure receiving element 83 returns from the second port 92 to the tank 27 via the timer check valve 98, the check valve piston 96a, and the pressure reducing valve 95, or returns to the tank 27 via the timer check valve 98 to be lowered. Thus, the backpressure valve 80 raises the backpressure and the high set pressure oil is supplied through the backpressure passage 29 and the suction valve 34a, whereby cavitation never occurs.

When the operating lever 39 is manipulated from the backing full position M to the neutral position N, in the same way as the aforesaid case of manipulating the operating lever 39 from the advancing position L to the neutral position N, the hydraulic motor 24 is braked and stopped, whereby cavitation never occurs in the second main circuit 22.

If the hydraulic motor 24 is inversely driven by an external force while being rotationally driven in the forward direction (indicated by the arrow S), the hydraulic motor 24 conducts a pumping action, so that the pressure at the first port 25 becomes low and the pressure at the second port 26 becomes high, and thus the pressure of the first main circuit 21 becomes lower (becomes approximately zero) than the set pressure of the backpressure valve 80. Consequently, the pilot pressure at the first pressure receiving element 53 is lowered, whereby the direction changeover valve 40 is held by the second spring 52 to be located in its neutral position A. Therefore, the outflow of pressurized oil of the second main circuit 22 to the return passage 28 is inhibited by the second check valve 56, thereby braking and stopping the hydraulic motor 24. Also in this case, similarly to the case of manipulating the operating lever 39 from the advancing position L to the neutral position N, cavitation never occurs in the first main circuit 21.

If the hydraulic motor 24 is inversely driven by an external force while being rotationally driven in the backward direction (indicated by the arrow R), in the same way as the aforesaid case where "the hydraulic motor 24 is inversely driven by external force while being rotationally driven in the forward direction", the hydraulic motor 24 is braked and stopped, whereby cavitation never occurs in the second main circuit 22.

Figure 5:
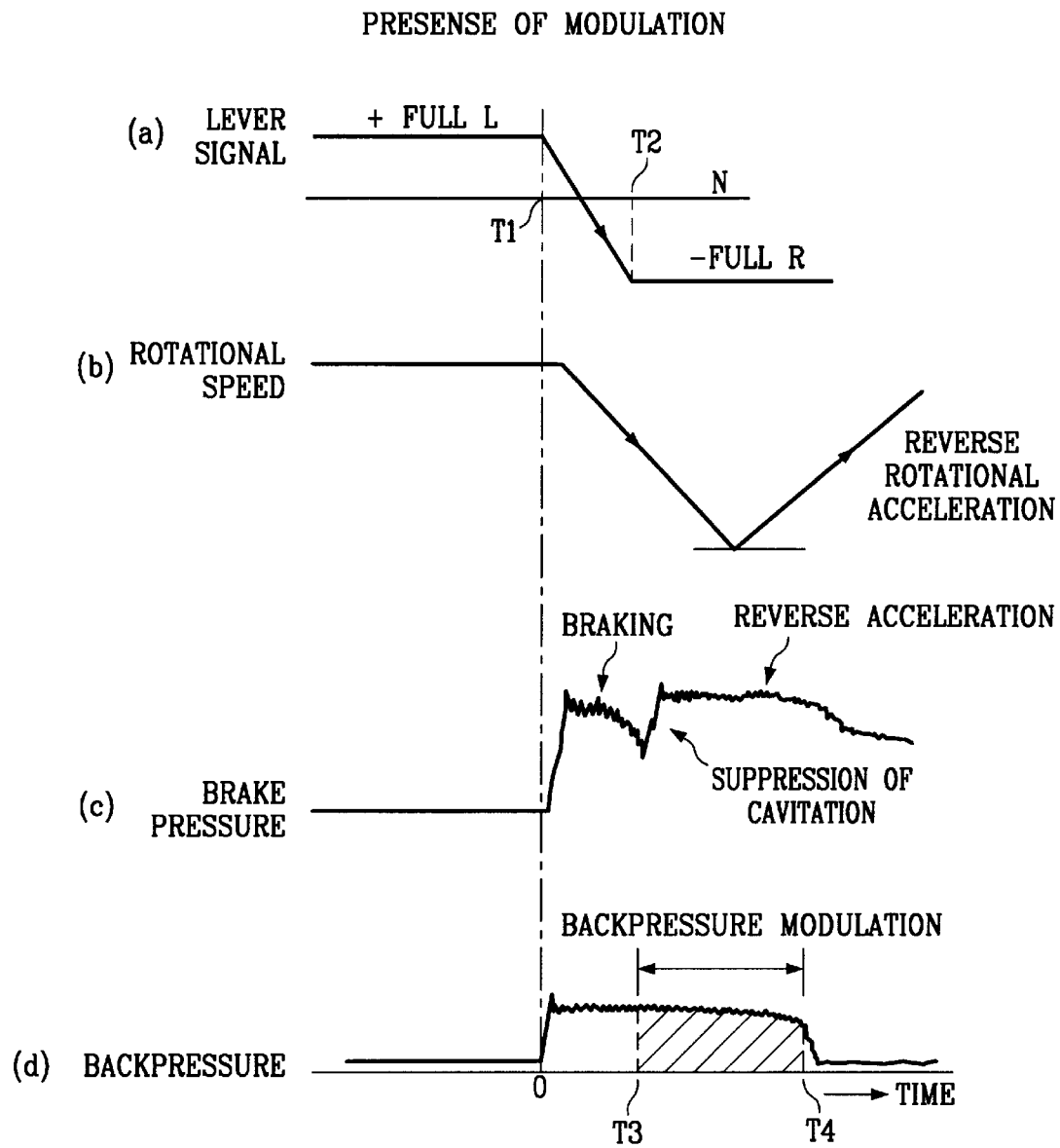
FIG. 5 is a time chart illustrating the situation of suppressed cavitation when the operating lever in FIG. 3 is operated from the advancing full position to a backing full position.

The case of swiftly switching the operating lever 39 from a traveling direction to the backing full position M or to the advancing full position L of the opposite direction while the hydraulic motor 24 is rotating at a high speed in the forward direction or in the backward direction will be described. FIG. 5 is a time chart in this case and the horizontal axis and the vertical axis thereof are the same as those in FIG. 4.

If the operator quickly manipulates the operating lever 39 from the advancing position L to the backing position M through the neutral position N between a time T1 and a time T2, the pilot pressure supply valve 60 moves from its first position G to its second position H. Following this movement, the direction changeover valve 40 receives pressurized oil of the second main circuit 22 at the second pressure receiving element 54, although it received pressurized oil of the first main circuit 21 at the first pressure receiving element 53 before this movement. At this time, since the hydraulic motor 24 is rotating by inertia force as shown in FIG. 5(b), in the second main circuit 22 which lets return oil flow from the hydraulic motor 24, the pressure of the return oil rises and operates on the hydraulic motor 24 as a brake pressure while operating on the second pressure receiving element 54 of the direction changeover valve 40 to switch the direction changeover valve 40 from its first position B to its second position C. Thus, return oil flows in the second main circuit 22 by the discharge of the hydraulic pump 20 and the inertial rotation of the hydraulic motor 24. Accordingly, the hydraulic motor 24 receives a pressure of reverse acceleration. Meanwhile, the first main circuit 21, which supplies pressurized oil to the hydraulic motor 24, tends to have a negative pressure while the hydraulic motor 24 is rotating by inertia force, since there is no pressurized oil to be supplied.

Consequently, the pressure which is supplied as the pilot pressure Pp from the first position G of the pilot pressure supply valve 60 to the pressure receiving element 83 of the backpressure valve 80, via the fifth pilot circuit 49 and the first port 91 of the modulation valve 90, decreases to nothing. Following this, the pilot pressure Pp of the pressure receiving element 83 returns to the tank 27 through the second port 92 the timer check valve 98, the check valve piston 96a, and the pressure reducing valve 95, or returns to the tank 27 via the timer check valve 98 to become a low pressure. However, since the pilot pressure supply valve 60 is already switched to its second position H, pressurized oil of the second main circuit 22 is supplied as the pilot pressure Pp to the pressure receiving element 83 of the backpressure valve 80 via the fifth pilot circuit 49 and the first port 91. In the present embodiment, however, the timer valve 99 is provided in the second port 92, so that the pilot pressure Pp of the pressure receiving element 83 is kept low without rising even if pressurized oil of the second main circuit 22 is supplied. Hence, the time for the backpressure valve 80 to maintain a backpressure is extended for the time period between T3 and T4. During this time period, oil discharged from the hydraulic pump 20 and flowing from the second main circuit 22 to the tank 27 and return oil flowing by inertial rotation of the hydraulic motor 24 are throttled, and the pressurized oil is returned to the first main circuit 22 via the return passage 28, the backpressure passage 29, and the suction valve 34a. Since the high set pressure oil is supplied through the backpressure passage 29 and the check valve 34a, cavitation never occurs. The time T4, with the high set pressure maintained, occurs at a point in time at which the direction of rotation of the hydraulic motor 24 is switched from the traveling direction to the backing position M or the advancing position L of the opposite direction.

Figure 6:
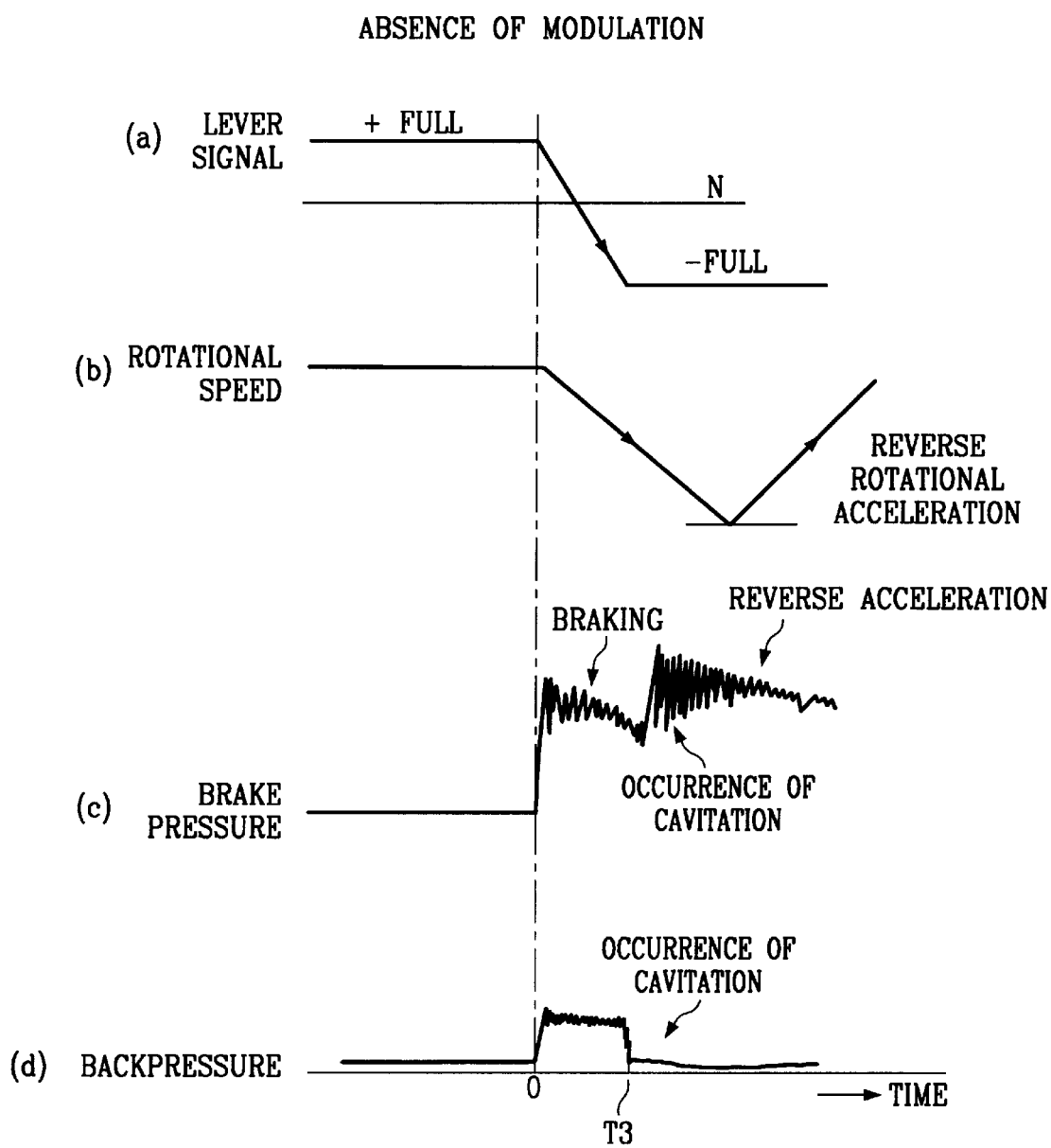
FIG. 6 is a time chart illustrating, as compared with FIG. 5, the situation of generating cavitation when the operating lever is operated from the advancing full position to the backing full position without attaching a modulation valve.

FIG. 6 is a time chart in the case where the modulation valve 90 in FIG. 2 is not attached, and illustrates the operation effects of the modulation valve 90. When the modulation valve 90 is not attached, pressurized oil of the second main circuit 22 is supplied at the time T3, the pilot pressure Pp of the pressure receiving element 83 rises, and the set pressure of the backpressure valve 80 is lowered. Thus, cavitation occurs as shown in FIG. 6.

According to the aforesaid first embodiment, when the hydraulic motor 24 is driven forwardly, the drive pressure is guided to the backpressure valve 80 to reduce the set pressure of the backpressure valve 80, thereby reducing the loss in drive power. When the direction changeover valve 40 is switched to its neutral position A, the set pressure of the backpressure valve 80 rises and high backpressures are supplied to the first main circuit 21 and the second main circuit 22, thus preventing cavitation which otherwise occurs at the time of braking and stopping. Moreover, even if the operating lever 39 is abruptly manipulated from the advancing position L to the backing position M or from the backing position M to the advancing position L, the occurrence of cavitation is prevented, since the backpressure valve 80 maintains the high set pressure for a predetermined time period by the modulation valve 90.

Next, the second embodiment of the backpressure control circuit for the hydraulic drive device according to the present invention will be described with reference to FIG. 7. A hydraulic pump 2 is driven by the engine 1. The hydraulic pump 2 is connected to a direction changeover valve 5 via a conduit 3. The direction changeover valve 5 is connected to the hydraulic motor 24 via conduits 16a and 16b. Moreover, the direction changeover valve 5 is connected to the backpressure valve 80 via the return passage 28, and the backpressure valve 80 is connected to the tank 27.

An operating lever 9 is coupled to an operating means 10. The input ports of the pilot valves 10a and 10b of the operating means 10 are connected to a pilot pressure source 6 via a conduit 8. The output ports of the pilot valves 10a and 10b are connected to a first pressure receiving element 5a and a second pressure receiving element 5b of the direction changeover valve 5 via conduits 7a and 7b, respectively. The pilot valves 10a and 10b are composed of pressure proportional control valves and generate a pilot pressure, which corresponds to a manipulated variable of the operating lever 9.

The hydraulic pump 2 includes a regulator 2a which controls a swash plate angle. The regulator 2a comprises a LS valve 2b, a servo valve 2c, a servo piston 2d, and the like. A first pressure receiving element 2e of the LS valve 2b is connected to the discharge line 3 of the hydraulic pump 2 through a line 4a, and a second pressure receiving element 2f is connected to a load pressure line 16i of the direction changeover valve 5 through a line 4b. The regulator 2a controls the swash plate angle of the hydraulic pump 2 by a differential pressure between a discharge pressure P1 of the hydraulic pump 2 guided from the conduit 3 and a load pressure LP1 (referred to as a LS pressure hereinafter) guided from the load pressure conduit 16i. Specifically, the regulator 2a controls to decrease the swash plate angle of the hydraulic pump 2 at the time when P1−LP1≧C, and to increase the swash plate angle of the hydraulic pump 2 at the time when P1−LP1<C, where C is a predetermined pressure and is normally set at about 20 kg/CM².

The direction changeover valve 5 includes pump ports 11a and 11b, tank ports 12a and 12b, first actuator ports 13a and 13b, second actuator ports 14a and 14b, and an LS pressure port 15a. The discharge conduit 3 of the hydraulic pump 2 is connected to the pump ports 11a and 11b, and the tank ports 12a and 12b are connected to the tank 27 through the return passage 28 and the backpressure valve 80. The first actuator port 13a is connected to a pressure compensating valve 17a via the conduit 16a, and the second actuator port 14a is connected to a pressure compensating valve 17b via the conduit 16b. The first actuator port 13b is connected to the line 16e via the conduit 16c, and the second actuator port 14b is connected to the line 16f via the conduit 16d. The LS pressure port 15a is connected to a LS shuttle valve 15. Another line of the LS shuttle valve 15 is connected to a LS pressure port 15a of another direction changeover valve (not shown) for controlling another hydraulic cylinder. As described above, the conduit 4b of the second pressure receiving element 2f is connected through the LS shuttle valve 15 to another direction changeover valve (not shown) which needs to successively apply a backpressure on a return oil.

The direction changeover valve 5 is a pilot pressure changeover type in which the direction changeover valve 5 is held at its neutral position A by a first spring 5c and a second spring 5d, is switched to its first position B by the pressure on the first pressure receiving element 5c, and is switched to its second position C by the pressure on the second pressure receiving element 5b. The direction changeover valve 5 is a closed center type and has a configuration wherein a predetermined difference in pressure occurs between an upstream side and a downstream side at the time of operation. In addition, of the flow discharged from the hydraulic pump 2, the direction changeover valve 5 passes only a flow which corresponds to the manipulated variable.

When the direction changeover valve 5 is in its neutral position A, the pump ports 11a and 11b are closed, and oil discharged from the hydraulic pump 2 flows into the tank 27 via the conduit 3, the LS unloading valve 18, and the backpressure valve 80. The discharged oil pressure at this time is the sum of the set pressure of the LS unloading valve 18 and the set pressure of the backpressure 80, since no LS pressure is generated in the first and second actuator ports 13a and 14a of the direction changeover valve 5. Meanwhile, the first and second actuator ports 13a and 14a of the direction changeover valve 5 and the LS pressure port 15a communicate with the tank ports 12a and 12b, and connect with the tank 27 via the return passage 28 and the backpressure valve 80. Accordingly, the respective pressures of the first and second main circuits 21 and 22 of the hydraulic motor 24 become equal to the set pressure of the backpressure valve 80, so that the hydraulic motor 24 does not rotate. Besides, even if an external force operates on the hydraulic motor 24, the hydraulic motor 24 does not rotate, since the first main circuit 21 and the second main circuit 22 are blocked by the second actuator ports 13b, 14b and the pressure compensating valves 17a and 17b.

Incidentally, when the direction changeover valve 5 is in its neutral position A, the LS unloading valve 18 maintains a discharge which corresponds to the minimum swash plate angle of the hydraulic pump 2 at a predetermined pressure and lets it go off into the tank 27 through the backpressure valve 80. The LS shuttle valve 15 compares a LS pressure of the direction changeover valve 5 with a LS pressure of another direction changeover valve and guides the higher LS pressure to the LS unloading valve 18.

When the direction changeover valve 5 is in its first position B, the pump port 11a communicates with the first actuator port 13a and the second actuator port 14b communicates with the tank port 12b. Therefore, oil discharged from the hydraulic pump 2 flows into the first port 25 of the hydraulic motor 24 via the conduit 3, the direction changeover valve 5, the conduit 16a, the pressure compensating valve 17a, the conduit 16e, and the first main circuit 21. Simultaneously, pressurized oil (return oil) flows from the second port 26 into the tank 27 via the second main circuit 22, the conduits 16f and 16d, the direction changeover valve 5, and the backpressure valve 80, so that the hydraulic motor 24 is rotationally driven in one direction (indicated by the arrow S).

When an actuator (not shown) is combinedly operated, the pressure compensating valves 17a and 17b select the highest pressure operating on the combinedly operated actuator as the pressure which is supplied via the LS shuttle valve 15, to control the pressure from the hydraulic pump 2 and to operate the actuator.

When the direction changeover valve 5 is in its second position C, the pump port 11b communicates with the second actuator port 14b, and the first actuator port 13b communicates with the tank port 12a. Hence, oil discharged from the hydraulic pump 2 flows into the second port 26 of the hydraulic motor 24 via the conduit 3, the direction changeover valve 5, the conduit 16b, the pressure compensating valve 17b, the conduit 16f, and the second main circuit 22. At the same time, pressurized oil (return oil) flows from the first port 25 into the tank 27 via the first main circuit 21, the conduits 16e and 16c, the direction changeover valve 5, and the backpressure valve 80, whereby the hydraulic motor 24 is rotationally driven in the other direction (indicated by the arrow R).

The backpressure valve 80 is the same one used in the first embodiment, but the first port 81 is connected to the tank ports 12a and 12b of the direction changeover valve 5 via the return passage 28; the second port 82 is connected to the tank 27; and the pressure receiving element 83 is connected by conduit 16j to the conduit 16i for introducing the LS pressure from the conduit 16i. When there is no LS pressure at the pressure receiving element 83, the backpressure valve 80 makes the first port 81 communicate with the second port 82 and lets the oil in the return passage 28 flow into the tank 27, while maintaining a predetermined set pressure (backpressure) in the return passage 28. However, if a LS pressure operates on the pressure receiving element 83, the backpressure valve 80 lowers the aforesaid set pressure (backpressure), whereby the backpressure of the return passage 28 is lowered. Incidentally, the main relief valve 36 and the safety valve 33 are the same as those in the first embodiment.

Next, the operation in FIG. 7 will be described. When the operating lever 9 is manipulated to the stop position N, the pilot valves 10a and 10b of the operating means 10 make the pilot lines 7a and 7b communicate with the tank 27. Thus, the direction changeover valve 5 is switched to its neutral position A, and oil discharged from the hydraulic pump 2 flows into the tank 27 through the conduit 3, the LS unloading valve 18, and the backpressure valve 80. The discharged oil pressure at this time is the sum of the set pressure of the LS unloading valve 18 and the set pressure of the backpressure 80. However, no load pressure is generated in the conduits 16a and 16b so that pressure does not operate the pressure receiving element 83 of the backpressure valve 80, thereby raising the set pressure of the backpressure valve 80. In the meantime, the conduits 16a and 16b, and the LS pressure port 15a connect with the tank 27 via the return passage 28 and the backpressure valve 80. Hence, the respective pressures of the first main circuit 21 and the second main circuit 22 of the hydraulic motor 24 become equal to the set pressure of the backpressure valve 80, so that the hydraulic motor 24 does not rotate. Besides, even if an external force operates on the hydraulic motor 24, the hydraulic motor 24 does not rotate, since the first main circuit 21 and the second main circuit 22 are shut off by the second actuator ports 13b and 14b and the pressure compensating valves 17a and 17b.

When the operating lever 9 is manipulated to the advancing position L, a pilot pressure of the pilot hydraulic source 6 operates on the first pressure receiving element 5a of the direction changeover valve 5 via the line 8, the pilot valve 10a, and the pilot line 7a. With this operation, the direction changeover valve 5 changes over to its first position B, oil discharged from the hydraulic pump 2 is supplied to the first main circuit 21 via the conduits 16a and 16e, and pressurized oil from the second main circuit 22 flows into the tank 27 via the conduits 16f and 16d, the return passage 28, and the backpressure valve 80. Thus, the hydraulic motor 24 is driven in the forward direction (indicated by the arrow S). At this time, a LS pressure is generated in the conduit 16a and the LS pressure acts on the pressure receiving element 83 of the backpressure valve 80 via the conduits 16i and 16j, thereby lowering the set pressure of the backpressure valve 80. Consequently, there is little loss in drive power.

When the operating lever 9 is manipulated to the backing position M, in the same way as the case of the aforesaid advancing position L, the hydraulic motor 24 is driven in the backward direction (indicated by the arrow R) and the set pressure of the backpressure valve 80 is reduced, so that there is little loss in drive power.

According to the aforesaid second embodiment, while the hydraulic motor 24 is driven, its LS Pressure (drive pressure) is guided to the backpressure valve 80 to lower the set pressure of the backpressure valve 80, thus reducing the loss in drive power. When the direction changeover valve 5 is in its neutral position A, high backpressures are supplied to the first main circuit 21 and the second main circuit 22, whereby cavitation occurring at a transition period of braking and stopping can be prevented.

Figure 7:
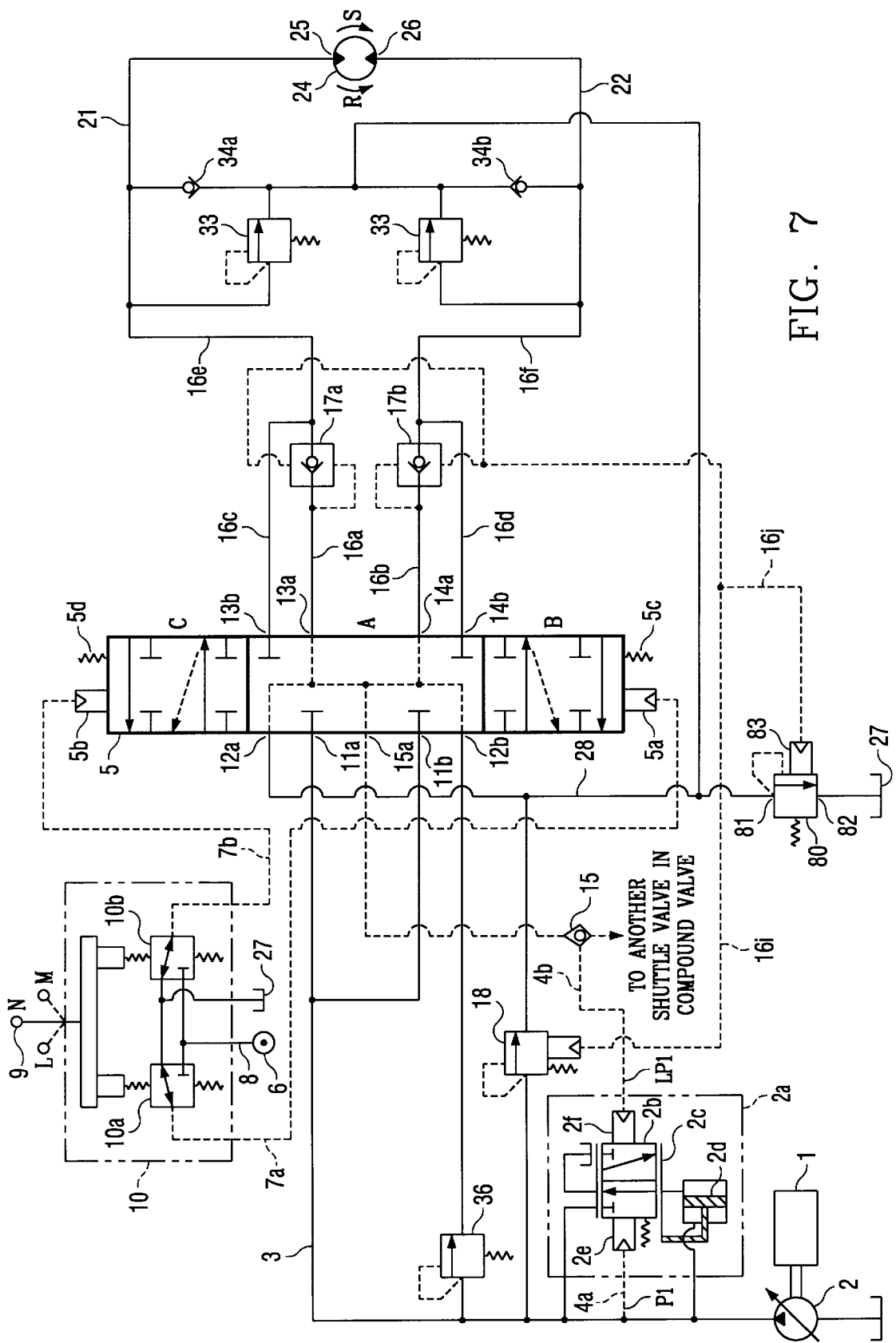
FIG. 7 is a schematic circuit diagram of a backpressure control circuit for a hydraulic drive device according to the second embodiment of the present invention.
Figure 8:
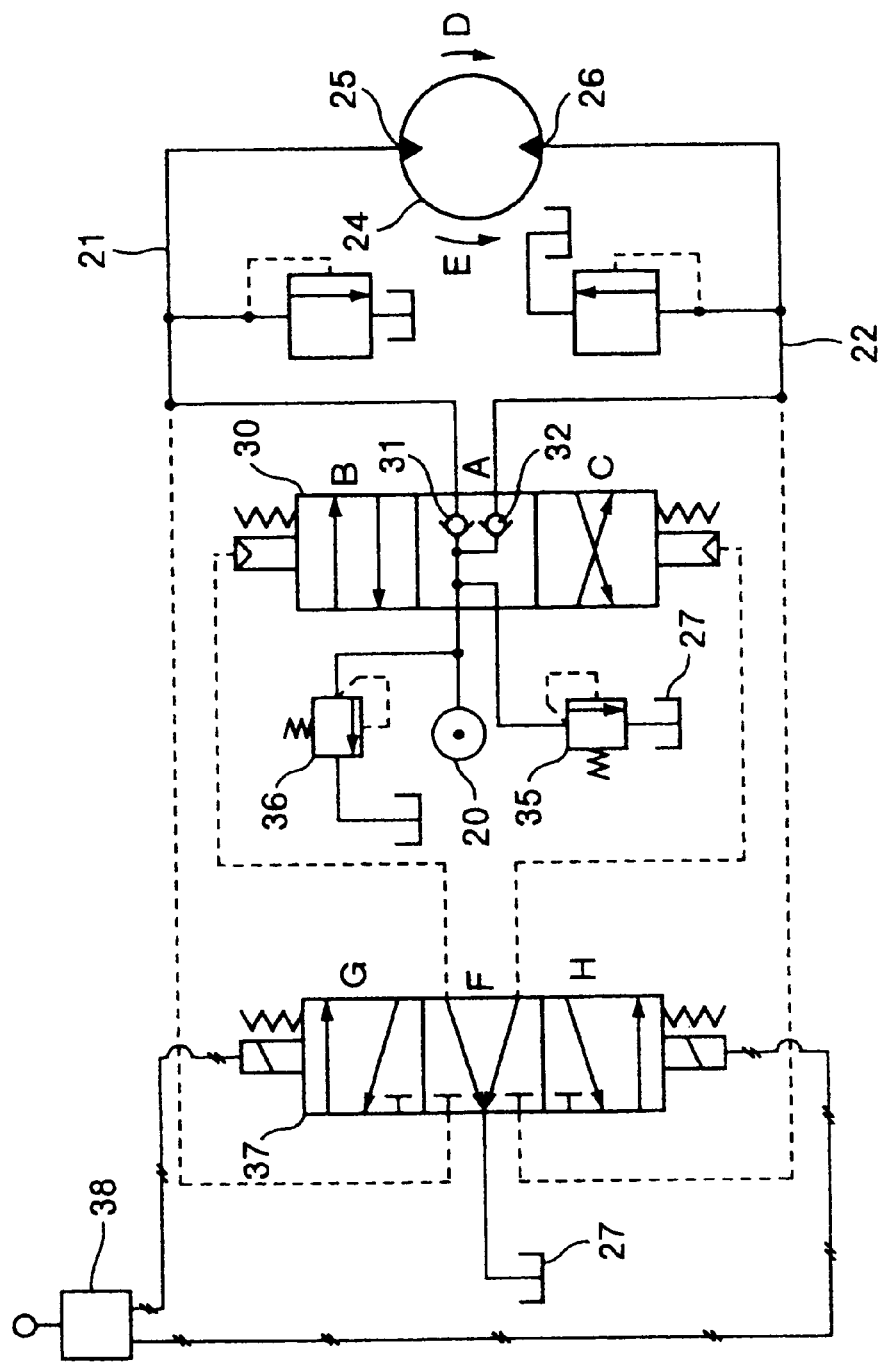
FIG. 8 is a drive circuit diagram of a hydraulic motor according to an unpublished proposal.
Figure 9:
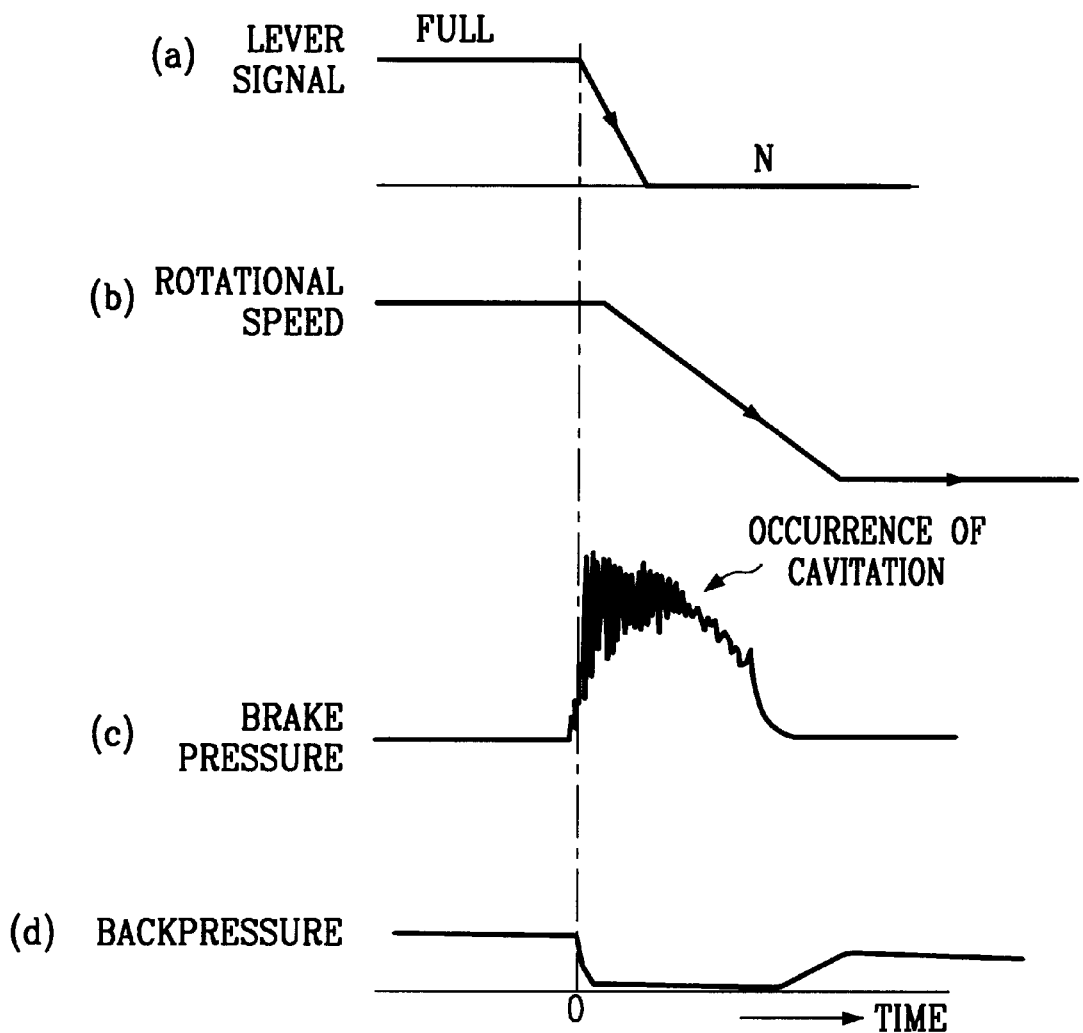
FIG. 9 is a time chart when an operating lever is operated from an advancing full position to a neutral position in the drive circuit diagram in FIG. 8.
Figure 10:
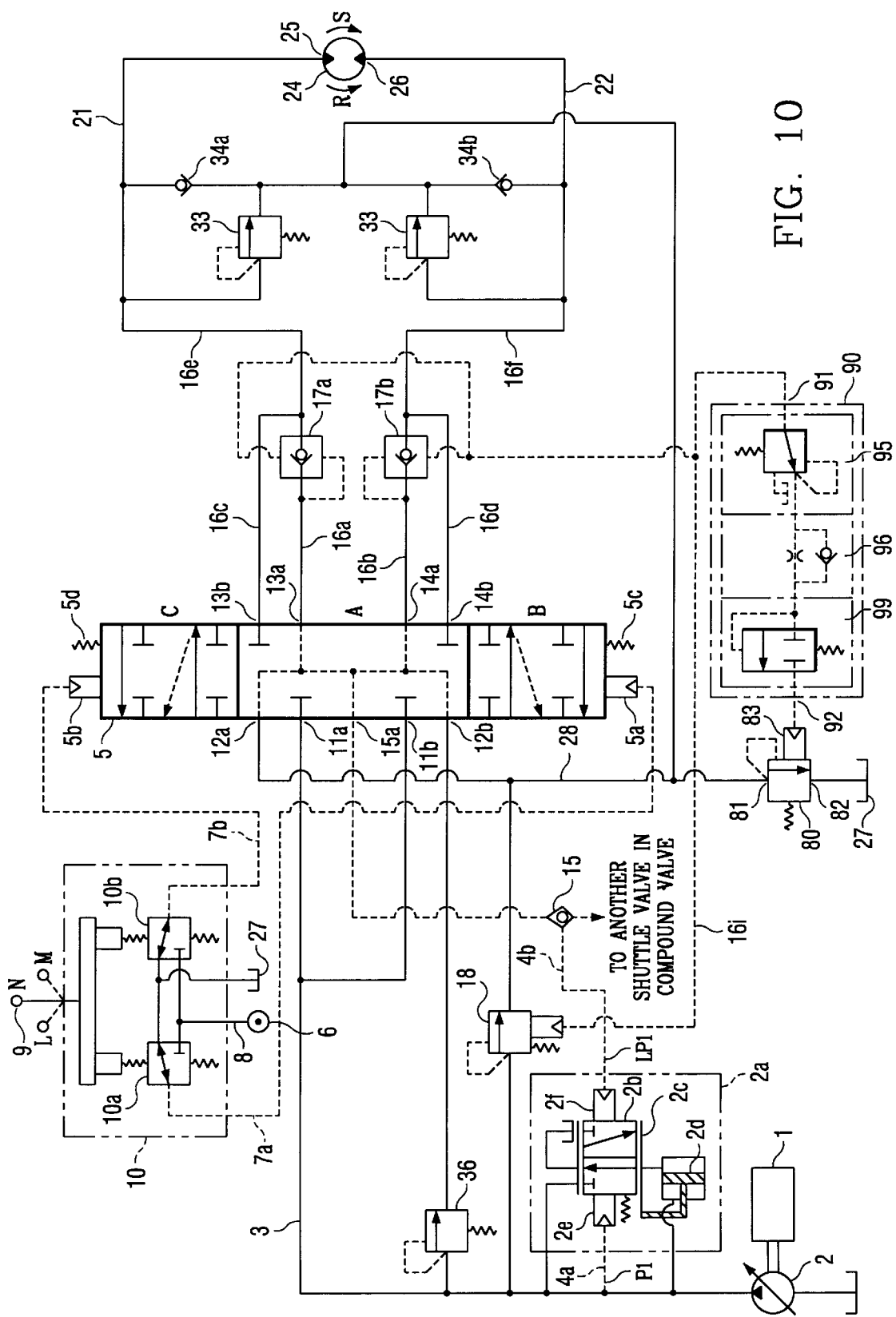
FIG. 10 is a schematic circuit diagram of a backpressure control circuit for a hydraulic drive device according to the second embodiment incorporating the modulation valve.

It goes without saying that the modulation valve 90 of the first embodiment can be attached in the second embodiment, as illustrated in FIG. 10, wherein the elements which are in common with FIG. 2 or FIG. 7 are identified by the same reference character, and thus a detailed description is omitted. The attachment of the modulation valve 90 can prevent cavitation which occurs when the operating lever 9 is quickly changed over from the traveling direction to the backing position M or the advancing position L of the opposite direction while the hydraulic motor 24 is rotating at a high speed in the forward direction or in the backward direction.

In the above embodiment, a case is described in which one direction changeover valve 5 and one hydraulic motor 24 are used. However, in addition to the above case, another case is also applicable in which a plurality of the direction changeover valves 5 and a plurality of hydraulic cylinders are used, pilot pressures are taken out from the LS pressure port 15a of direction changeover valves 5 which need to prevent cavitation from among a plurality of direction changeover valves 5, and the pilot pressures are unified via the LS shuttle valve 15 to be connected to the backpressure valve 80.

Thus, cavitation in a hydraulic actuator, which is prone to cause cavitation, can be prevented. Meanwhile, in a hydraulic actuator which does not tend to cause cavitation, the return flow is no longer throttled so that the pressure loss of the return oil is reduced and the loss in drive power is also reduced, which results in saving energy.

INDUSTRIAL AVAILABILITY

The present invention is useful as a backpressure control circuit for a hydraulic drive device which reduces the loss in drive power and which can suppress cavitation which otherwise occurs at the time of stopping and reverse rotation during high speed rotation.

What is claimed is:
1. Apparatus comprising:
an operating lever;
a hydraulic pump;
a hydraulic actuator;
a direction changeover valve;
a tank; and
a hydraulic drive circuit for supplying pressurized oil from said hydraulic pump to said hydraulic actuator via said direction changeover valve and for passing return oil from said hydraulic actuator through said direction changeover valve to said tank;
wherein said hydraulic drive circuit includes:
a first check valve;
a pilot valve for taking a pressure on a drive side of said hydraulic actuator as a pilot pressure upon receipt by said pilot valve of a signal from said operating lever,
a variable throttle valve for throttling, at a time of braking by said hydraulic actuator, said return oil from said hydraulic actuator and oil discharged from said hydraulic pump to generate a backpressure of said variable throttle valve in order to supply pressurized oil to said hydraulic actuator via said first check valve in order to suppress cavitation, wherein upon receipt of said pilot pressure from said pilot valve said variable throttle valve changes said backpressure to (a) a low pressure, at which said return oil flows from said hydraulic actuator into said tank via said variable throttle valve, or (b) a high pressure, at which said return oil from said hydraulic actuator is supplied to a drive side of said hydraulic actuator, and
a prolonging means for prolonging and maintaining said pilot pressure for a predetermined time period and for allowing said pilot pressure to operate on said variable throttle valve when said direction changeover valve is switched.

2. Apparatus in accordance with claim 1, wherein said variable throttle valve has a pressure receiving surface for controlling said variable throttle valve, and wherein said prolonging means is connected between said pilot valve and said pressure receiving surface of said variable throttle valve.

3. Apparatus in accordance with claim 1, wherein said hydraulic actuator is a hydraulic motor.

4. Apparatus in accordance with claim 1, wherein said prolonging means comprises a timer valve.

5. Apparatus in accordance with claim 1, wherein said prolonging means comprises a pressure reducing valve, a throttle valve, and a timer valve.

6. Apparatus in accordance with claim 1, wherein said direction changeover valve is switched from one of its positions to another of its positions responsive to said pilot pressure.

7. Apparatus in accordance with claim 1, wherein said hydraulic drive circuit comprises:
   a first conduit connecting a first actuator port of said direction changeover valve with a first port of said hydraulic actuator;
   a second conduit connecting a second actuator port of said direction changeover valve with a second port of said hydraulic actuator; and
   a second check valve; and
   wherein said first check valve is connected between said first conduit and an inlet port of said variable throttle valve for supplying oil at said backpressure to said first conduit, and said second check valve is connected between said second conduit and said inlet port of said variable throttle valve for supplying oil at said backpressure to said second conduit.

8. Apparatus in accordance with claim 7, wherein said variable throttle valve has a pressure receiving surface for controlling said variable throttle valve, and wherein said prolonging means is connected between said pilot valve and said pressure receiving surface of said variable throttle valve.

9. Apparatus in accordance with claim 8, wherein said hydraulic actuator is a hydraulic motor.

10. Apparatus in accordance with claim 9, wherein said prolonging means comprises a timer valve.

11. Apparatus in accordance with claim 9, wherein said prolonging means comprises a pressure reducing valve, a throttle valve, and a timer valve.

12. Apparatus in accordance with claim 9, further comprising a main relief valve connected between said hydraulic pump and said inlet port of said variable throttle valve.

13. Apparatus in accordance with claim 9, wherein said direction changeover valve is switched from one of its positions to another of its positions responsive to said pilot pressure.

14. Apparatus comprising:
   an operating lever;
   proportional pressure control valves for outputting a proportional pressure signal, said proportional pressure control valves being operated by said operating lever;
   a hydraulic pump;
   a hydraulic actuator;
   a direction changeover valve, which is switched from one of its positions to another of its positions responsive to a proportional pressure signal from said proportional pressure control valves;
   a tank;
   a hydraulic drive circuit for supplying pressurized oil from said hydraulic pump to said hydraulic actuator via said direction changeover valve and for passing return oil from said hydraulic actuator through said direction changeover valve to said tank;
   wherein said hydraulic drive circuit includes:
      a first check valve;
      means for taking a load pressure of said hydraulic drive circuit as a pilot pressure;
      a variable throttle valve for throttling said return oil from said hydraulic actuator and oil discharged from said hydraulic pump to generate a backpressure of said variable throttle valve in order to supply pressurized oil to said hydraulic actuator via said first check valve in order to suppress cavitation, wherein upon receipt of said pilot pressure said variable throttle valve changes said backpressure to (a) a low pressure at which said return oil from said hydraulic actuator flows into said tank via said variable throttle valve or (b) a high pressure at which said return oil from said hydraulic actuator is supplied to a drive side of said hydraulic actuator, and
      a prolonging means for prolonging and maintaining said pilot pressure for allowing said pilot pressure to operate on said variable throttle valve when said direction changeover valve is switched.

15. Apparatus in accordance with claim 14, wherein said variable throttle valve has a pressure receiving surface for controlling said variable throttle valve, and wherein said prolonging means is connected between said pilot valve and said pressure receiving surface of said variable throttle valve.

16. Apparatus in accordance with claim 14, wherein said hydraulic actuator is a hydraulic motor.

17. Apparatus in accordance with claim 14, wherein said prolonging means comprises a timer valve.

18. Apparatus in accordance with claim 14, wherein said hydraulic drive circuit comprises:
   a first conduit connecting a first actuator port of said direction changeover valve with a first port of said hydraulic actuator;
   a second conduit connecting a second actuator port of said direction changeover valve with a second port of said hydraulic actuator; and
   a second check valve; and
   wherein said first check valve is connected between said first conduit and an inlet port of said variable throttle valve for supplying oil at said backpressure to said first conduit, and said second check valve is connected between said second conduit and said inlet port of said variable throttle valve for supplying oil at said backpressure to said second conduit.

19. Apparatus in accordance with claim 18, wherein said variable throttle valve has a pressure receiving surface for controlling said variable throttle valve, and wherein said prolonging means is connected between said pilot valve and said pressure receiving surface of said variable throttle valve.

20. Apparatus in accordance with claim 19, wherein said hydraulic actuator is a hydraulic motor.

* * * * *